United States Patent
Nagshain

(10) Patent No.: US 7,330,930 B1
(45) Date of Patent: Feb. 12, 2008

(54) METHOD AND APPARATUS FOR BALANCED DISK ACCESS LOAD DISTRIBUTION

(75) Inventor: Madhuresh Nagshain, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 200 days.

(21) Appl. No.: 11/053,818

(22) Filed: Feb. 8, 2005

Related U.S. Application Data

(60) Provisional application No. 60/551,991, filed on Mar. 9, 2004.

(51) Int. Cl.
*G06F 12/02* (2006.01)
*G06F 12/16* (2006.01)
*G06F 13/00* (2006.01)

(52) U.S. Cl. .................. 711/114; 711/112; 711/162

(58) Field of Classification Search ............ 711/1–221; 710/1–317; 369/14, 24.01–42.01, 47.1–47.5, 369/83–92, 292; 707/204
See application file for complete search history.

(56) References Cited

U.S. PATENT DOCUMENTS

| | | | |
|---|---|---|---|
| 5,495,570 A * | 2/1996 | Heugel et al. ................. 714/11 |
| 5,708,769 A * | 1/1998 | Stallmo ........................ 714/6 |
| 5,790,773 A * | 8/1998 | DeKoning et al. ............. 714/6 |
| 5,805,863 A * | 9/1998 | Chang ......................... 717/158 |
| 5,819,310 A * | 10/1998 | Vishlitzky et al. ........... 711/114 |
| 6,112,257 A * | 8/2000 | Mason, Jr. et al. ........... 710/18 |
| 6,141,707 A * | 10/2000 | Halligan et al. .............. 710/36 |
| 6,339,818 B1 * | 1/2002 | Olszewski et al. ........... 711/173 |
| 6,442,650 B1 * | 8/2002 | Bachmat et al. ............. 711/114 |
| 6,611,896 B1 * | 8/2003 | Mason, Jr. et al. ......... 711/114 |
| 6,715,054 B2 * | 3/2004 | Yamamoto .................. 711/170 |
| 6,721,845 B1 * | 4/2004 | Clegg et al. ................. 711/114 |
| 6,754,770 B2 * | 6/2004 | Kang et al. .................. 711/114 |
| 6,775,739 B1 * | 8/2004 | Bachmat et al. ............. 711/114 |
| 6,898,668 B2 * | 5/2005 | Thompson et al. .......... 711/114 |
| 6,954,833 B1 * | 10/2005 | Yochai et al. ................ 711/162 |

OTHER PUBLICATIONS

S. Chen and D. Towsley, "A Performance Evaluation of RAID Architectures," IEEE Trans. Computers, vol. 45, No. 10, pp. 1116-1130, Oct. 1996.*
Hyang Jae Park and Heonshik Shin, "Real-time disk scheduling techniques for mirrored disk systems," TENCON '94. IEEE Region 10's Ninth Annual International Conference, Theme: 'Frontiers of Computer Technology', vol. 1 pp. 474-480, Aug. 22-26, 1994.*
Andrew S. Tanenbaum, "Structured Computer Organization, Second Edition", Prentice-Hall, Inc., 1984, pp. 10-12.*

* cited by examiner

*Primary Examiner*—Hyung Sough
*Assistant Examiner*—Carl Brienen
(74) *Attorney, Agent, or Firm*—Martine Penilla & Gencarella, LLP

(57) ABSTRACT

Broadly speaking a method and an apparatus is provided for distributing commands to a digital data storage system. More specifically, the method and apparatus distributes read commands to a mirrored pair of disk drives in a substantially balanced manner. A read command having an associated starting address is received from an operating system. An address range is updated based on the starting address associated with the read command. A determination is made as to a portion of the address range containing the starting address associated with the read command. The read command is directed to be performed using a disk drive associated with the portion of the address range determined to contain the starting address.

26 Claims, 9 Drawing Sheets

METHOD AND APPARATUS FOR BALANCED DISK ACCESS LOAD DISTRIBUTION

CROSS REFERENCE TO RELATED APPLICATIONS

This application claims the benefit of U.S. Provisional Application No. 60/551,991, filed Mar. 9, 2004.

BACKGROUND OF THE INVENTION

1. Field of the Invention

The present invention relates generally to digital data storage system operation. More specifically, the present invention relates to a method and an apparatus for distributing commands to a digital data storage system.

2. Description of the Related Art

The operating system (OS) of a computer controls the delivery of read commands to a storage medium (e.g., disk drive). For example, in the case of a redundant array of independent disks (RAID) mirroring implementation, where multiple disk drives are employed, the OS will send the read commands to the queue of a primary drive until that drive is full. When the queue of the primary drive is full, the read commands are held until the queue for the primary drive is decreased. Therefore, the OS is forced to wait until the primary drive processes read commands to free up capacity in the queue.

FIG. 1 shows a block diagram 100 depicting how read commands are handled for a software RAID implementation, in accordance with the prior art. An application 102 requires data and notifies the operating system (OS) 104. The operating system 104 issues a read command to a RAID driver 106. In the case of RAID level 1 (mirroring), both read and write commands are sent to a primary drive D1 108 from the RAID driver 106. A secondary drive D2 110 is used to process write commands, but is not utilized to process read commands. As more read commands are issued from the operating system 104, the read commands are queued to be processed by the primary drive D1 108. For example, the primary drive D1 108 has a random access memory (RAM) in which tagged command queuing is performed. The read commands continue to accumulate until the queue for primary drive D1 108 reaches a full level. While the primary drive D1 108 can theoretically queue up to 256 commands, typically the primary drive D1 108 issues a queue full message to stop sending additional read commands after 16, 32, or 64 commands have been queued. When the primary drive D1 108 issues a queue full message, the read commands are held until the primary drive D1 108 sends a response that a read command has been processed. Since a disk drive is much slower than a central processing unit (CPU), because of the physical limitations of the mechanical activity of the disk drive, the disk drive becomes the main bottleneck. Therefore, as the OS 104 continues to issue more commands, the primary drive D1 108 is unable to provide the desired throughput.

FIG. 2 shows a block diagram 112 depicting how read commands are handled for a hardware RAID implementation, in accordance with the prior art. FIG. 2 is substantially similar to FIG. 1 except that a RAID controller 114 replaces the RAID driver 106. The RAID controller 114 includes firmware FW 116 which directs the read commands to the primary drive D1 108. Again, the read commands are queued in the RAM of the primary drive D1 108. Accordingly, the same bottleneck exists. Furthermore, it should be appreciated that while write commands are issued to primary drive D1 108 and secondary drive D2 110, especially in the case of RAID level 1 (mirroring), the read commands are only issued to the primary drive D1 108.

Under the configurations of FIGS. 1 and 2, the primary drive D1 108 is exercised much more than the secondary drive D2 110. Therefore, excessive use of the primary drive D1 108 contributes to a higher probability of failure for the primary drive D1 108 than for the secondary drive D2 110. Consequently, a shorter mean time between failures (MTBF) is encountered for the primary drive D1 108. Also, consecutive read commands processed by the primary drive D1 108 may reference addresses that are physically remote with respect to each other. In these instances, the relatively large movement required of a read head results in an increased latency in performing the read command. Consequently, the increased latency causes a reduction in overall read command processing performance.

In view of the foregoing, there is a need to solve the problems of the prior art by determining a way to balance read commands more evenly between multiple disk drives. Also, the solution to the problems of the prior art should enhance the performance and reliability of the disk drives.

SUMMARY OF THE INVENTION

Broadly speaking a method and an apparatus is disclosed for distributing commands to a digital data storage system. More specifically, the present invention provides a method and an apparatus for distributing read commands to a mirrored pair of disk drives. A portion of each of the mirrored pair of disk drives is mapped to a logical drive. A read range of addresses in the logical drive is defined by minimum and maximum addresses that have been read. The read range is updated to ensure that addresses associated with each processed read command are included in the read range. The read commands are distributed to the mirrored pair of disk drives based on a bisectional division of the read range. In the case where the address associated with the read command is contained within a first half of the read range, the read command is directed to be performed using a first disk drive of the mirrored pair of disk drives. In the case where the address associated with the read command is contained within a second half of the read range, the read command is directed to be performed using a second disk drive of the mirrored pair of disk drives. Additionally, the minimum and maximum addresses defining the read range can be reset (i.e., re-initialized) based on established criteria during processing of read commands. Thus, the read range can be controlled to ensure that distribution of read commands to each of the mirrored pair of disks occurs in a substantially balanced manner during extended processing of read commands.

In one embodiment, a method for distributing read commands to multiple disk drives is disclosed. The method includes receiving a read command from an operating system. The read command is associated with a starting address contained within the disk drives. The method further includes updating an address range based on the starting address and determining a portion of the address range containing the starting address. The read command is then directed to be performed using a disk drive associated with the portion of the address range containing the starting address.

In another embodiment, a method for controlling utilization of a mirrored pair of digital data storage media is disclosed. The method includes establishing a range of logical block addresses, wherein the range is bounded by a minimum logical block address and a maximum logical block address. A read command associated with a logical block address is received. The logical block address of the read command is compared to the minimum and maximum logical block addresses to determine if an adjustment should be made to the minimum logical block address and/or the maximum logical block address. The method further includes adjusting the minimum and maximum logical block addresses based on the comparison between the logical block address of the read command and the minimum and maximum logical block addresses. The method continues by identifying a portion of the range of logical block addresses that contains the logical block address of the read command. The read command is then directed to be performed using a digital data storage media associated with the identified portion of the range of logical block addresses.

In another embodiment, a computer readable media containing program instructions for distributing read commands to multiple disk drives is disclosed. The computer readable media includes program instructions for receiving a read command from an operating system. The read command is associated with a starting address contained within the disk drives. The computer readable media further includes program instructions for updating an address range based on the starting address and determining a portion of the address range containing the starting address. The computer readable media also includes program instructions for directing the read command to be performed using a disk drive associated with the portion of the address range containing the starting address.

In another embodiment, an apparatus for distributing read commands to multiple disk drives is disclosed. The apparatus includes a central processing unit and a memory to be controlled by the central processing unit. The memory contains an operating system for generating read commands. A logical drive is also defined within the memory and is mapped to a portion of each of a mirrored pair of disk drives. The mirrored pair of disk drives includes a first disk drive and a second disk drive. The apparatus further includes a driver disposed to be in communication with the mirrored pair of disk drives. The driver is configured to monitor a read range within the logical drive. The read range is defined by a minimum address having been read from the logical drive and a maximum address having been read from the logical drive. The driver is also configured to identify a read command as being directed to either a first half of the read range or a second half of the read range. The driver is further configured to direct the read command to the first disk drive when the read command is identified as being directed to the first half of the read range. Additionally, the driver is configured to direct the read command to the second disk drive when the read command is identified as being directed to the second half of the read range.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides a method and an apparatus for distributing commands to a digital data storage system. More specifically, the present invention provides a method and an apparatus for distributing read commands to a mirrored pair of disk drives. A portion of each of the mirrored pair of disk drives is mapped to a logical drive. A read range of addresses in the logical drive is defined by minimum and maximum addresses that have been previously read. Upon processing of each read command, the read range is updated as necessary to ensure that an address associated with the read command presently being processed is included in the read range. The read commands are distributed to the mirrored pair of disk drives based on a bisectional division of the read range. In the case where the address associated with the read command is contained within a first half of the read range, the read command is directed to be performed using a first disk drive of the mirrored pair of disk drives. In the case where the address associated with the read command is contained within a second half of the read range, the read command is directed to be performed using a second disk drive of the mirrored pair of disk drives. Additionally, the minimum and maximum addresses defining the read range can be reset (i.e., re-initialized) based on established criteria during processing of read commands. Thus, the read range can be controlled to ensure that distribution of read commands to each of the mirrored pair of disks occurs in a substantially balanced manner during extended processing of read commands.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
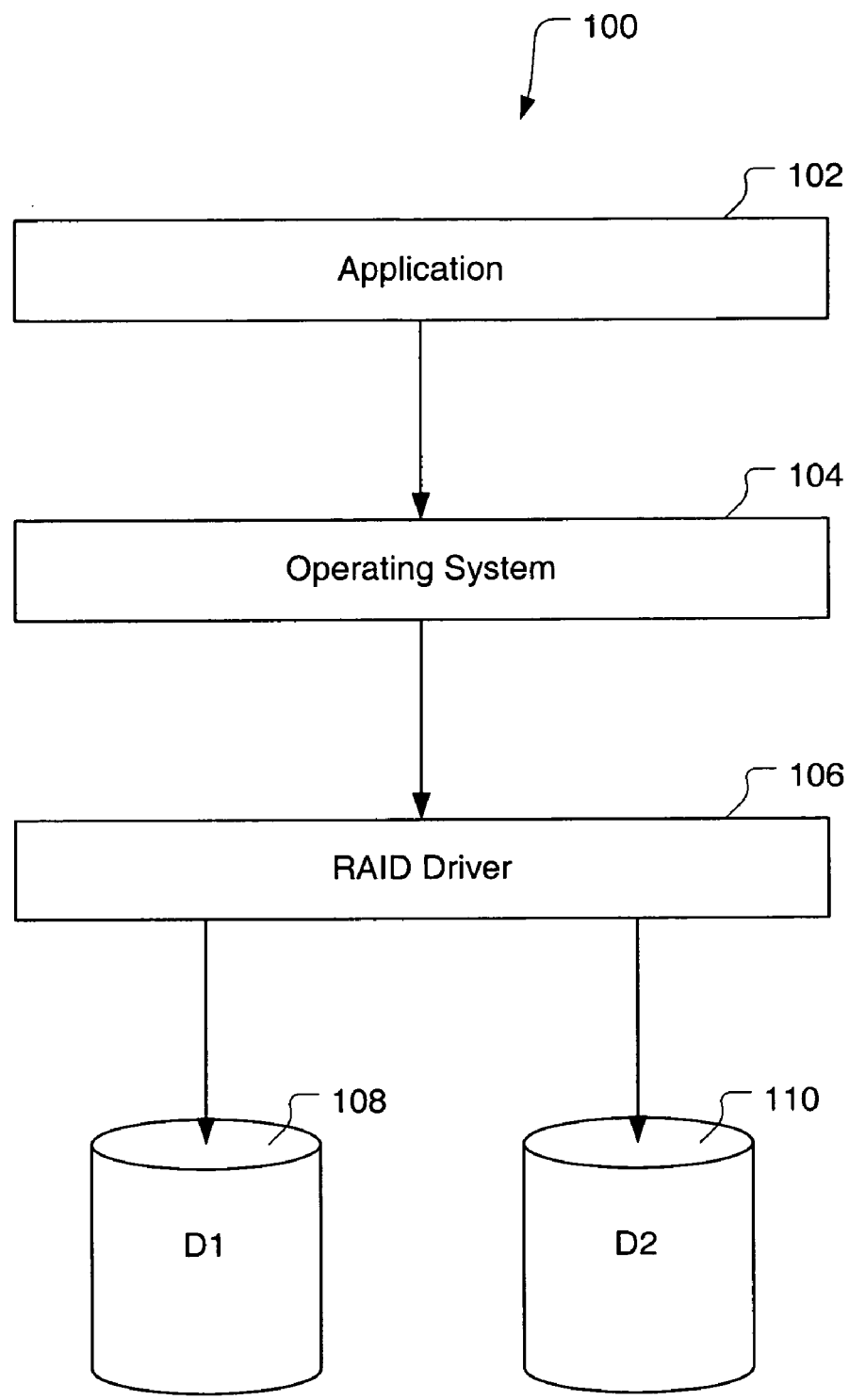
FIG. 1 shows a block diagram depicting how read commands are handled for a software RAID implementation, in accordance with the prior art.
Figure 2:
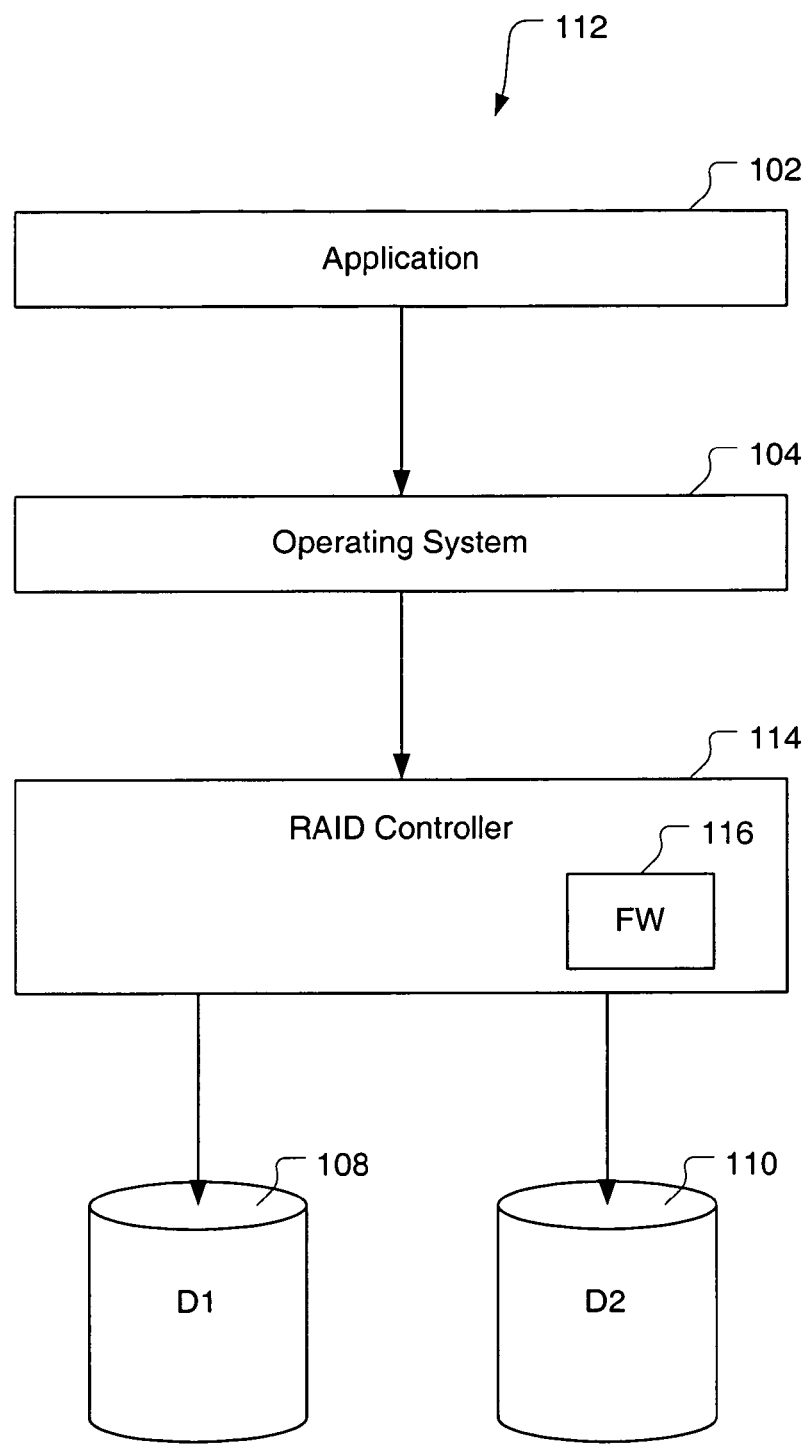
FIG. 2 shows a block diagram depicting how read commands are handled in for a hardware RAID implementation, in accordance with the prior art.
Figure 3:
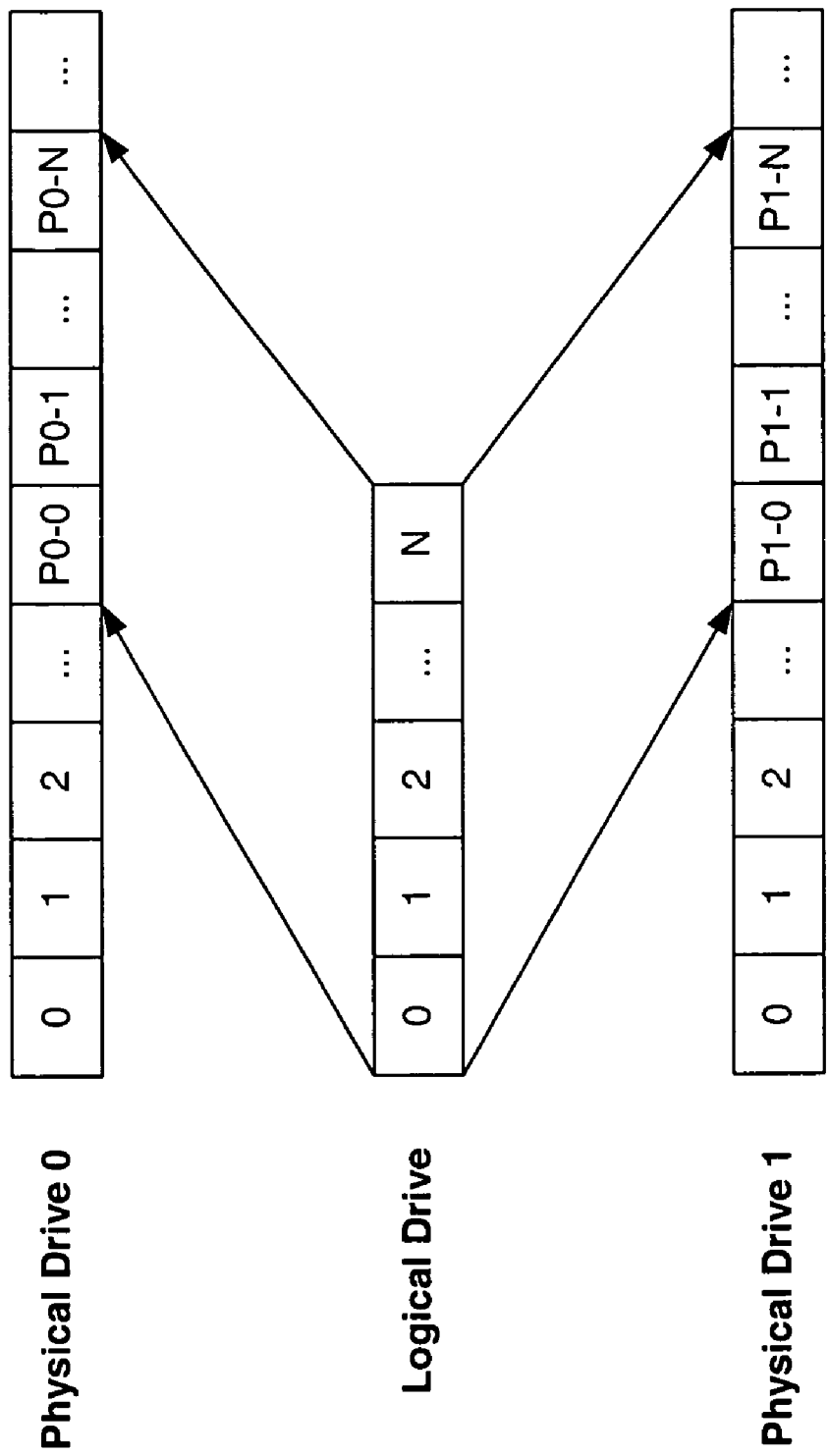
FIG. 3 is an illustration showing a logical drive mapped to a mirrored pair of physical drives, in accordance with one embodiment of the present invention.

FIG. 3 is an illustration showing a logical drive mapped to a mirrored pair of physical drives, in accordance with one embodiment of the present invention. In one embodiment, the mirrored pair of disk drives can be used to implement a redundant array of independent disks (RAID) level 1 storage system. The logical drive is defined in a memory to have 0 to N blocks. Each of the 0 to N blocks is assigned an address. The mirrored pair of physical drives is represented by a physical drive 0 and a physical drive 1. Each of the physical drives 0 and 1 contain a number of blocks identified by addresses. The 0 to N blocks of the logical drive are mapped to an equal number of blocks of each of the physical drives 0 and 1. For example, the logical blocks 0 and N are mapped to blocks P0-0 and P0-N, respectively, of physical drive 0. Also, the logical blocks 0 and N are mapped to blocks P1-0 and P1-N, respectively, of physical drive 1. Each of the logical blocks between 0 and N are mapped to corresponding blocks between P0-0 and P0-N and corresponding blocks between P1-0 and P1-N. In one embodiment, each of the mirrored pair of physical drives are equal in size to the logical drive. However, in other embodiments one or both of the mirrored pair of physical drives is/are larger in size than the logical drive. Also, the mirrored pair of physical drives can have either the same or different sizes with respect to one another. Furthermore, in various embodiments, the blocks of each physical drive that are mapped to the logical drive can occupy the same or different positions within the respective physical drives. In each embodiment, however, the data contained in blocks P0-0 through P0-N is equivalent to the data contained in blocks P1-0 through P1-N, respectively. In one embodiment, a properties table for each of the physical drives can be used to correlate the blocks 0 to N of the logical drive to the particular blocks P0-0 to P0-N and P1-0 to P1-N of the physical drives. The property table for each of the physical drives can also include other information such as a disk size and a disk identifier.

It should be appreciated that operating systems are constantly generating read and write commands for data resident in storage media. With a system implementing a mirrored pair of disk drives, up to twice the number of read commands can be processed as compared to a system where the read commands are directed to a single disk drive. Also, in one embodiment, the read commands can be processed in a multithreaded environment so that multiple read commands can be processed concurrently. Furthermore, in one embodiment, each of the mirrored pair of disk drives can be equipped with a queuing capability so that a number of read commands can be queued for subsequent processing by the disk drive.

Figure 4:
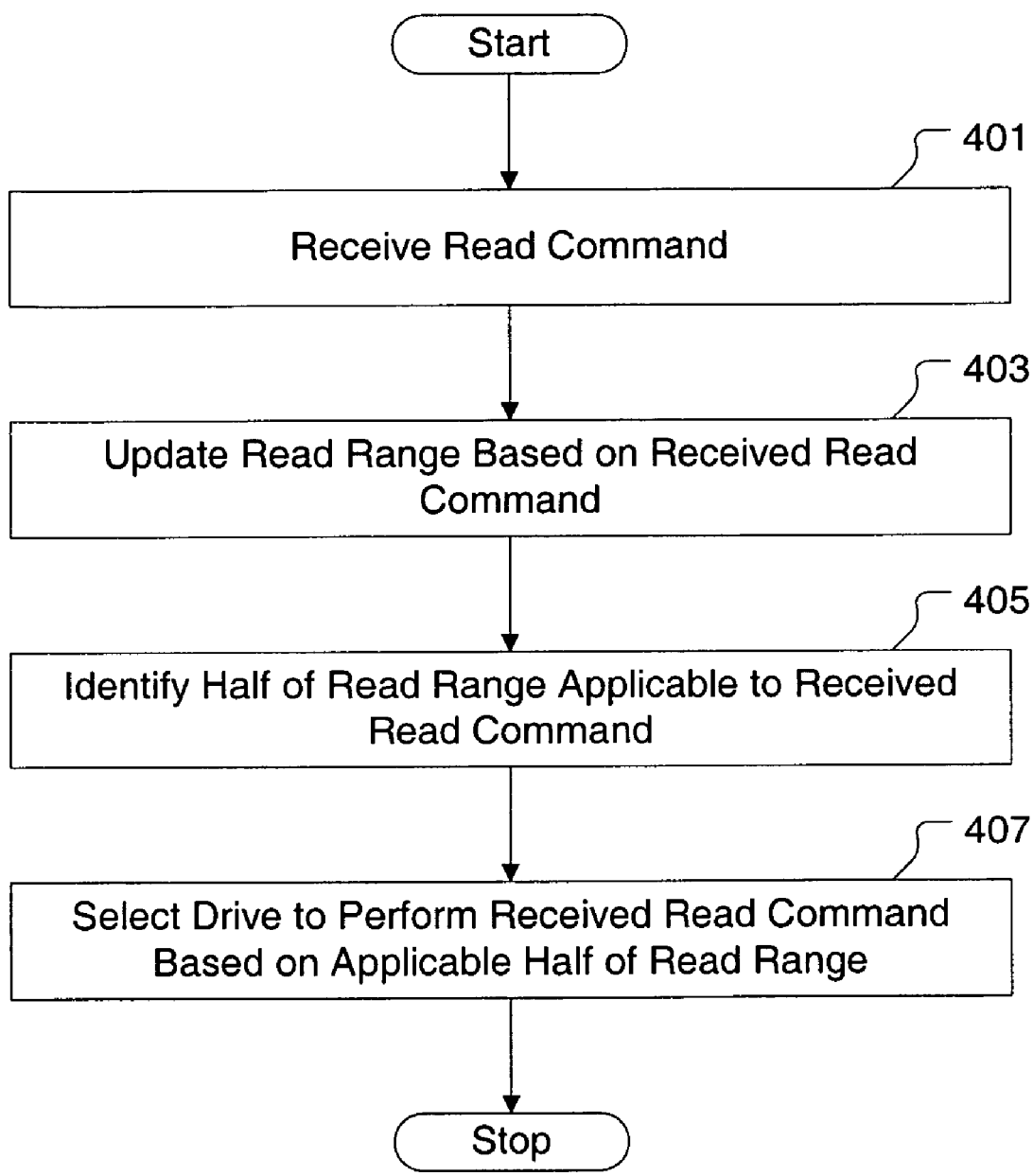
FIG. 4 is an illustration showing a method for distributing read commands to multiple disk drives, in accordance with one embodiment of the present invention.

FIG. 4 is an illustration showing a method for distributing read commands to multiple disk drives, in accordance with one embodiment of the present invention. The method begins with an operation 401 in which a read command is received for processing. In one embodiment, the read command is received by a driver from an operating system. In various embodiments, the driver can be implemented as either software or hardware. The method continues with an operation 403 in which a read range is updated based on the received read command. The read range is defined by a minimum block address and a maximum block address. Each of the minimum and maximum block addresses represent addresses that have been previously accessed in read commands. In one embodiment, the read range is based on a logical drive configuration with the minimum and maximum block addresses referring to logical drive block addresses. If the current read command is directed to an address that is less than the existing minimum address, the minimum address is updated to correspond to the address to be accessed by the current read command. Also, if the current read command is directed to an address that is greater than the existing maximum address, the maximum address is updated to correspond to the address to be accessed by the current read command. If the current read command is directed to an address that is between the existing minimum and maximum addresses, the existing minimum and maximum addresses will remain unchanged. Thus, the minimum and maximum addresses and the corresponding read range are dynamically updated based on the address to be accessed by each received read command. Once the read range is updated as appropriate, an operation 405 is performed to identify a half of the read range that is applicable to the current read command being processed. Each half of the read range is defined by performing a bisectional division of the read range. Therefore, a first half of the read range represents a segment of block addresses extending from the minimum address to the midpoint address of the read range. A second half of the read range represents a segment of block addresses extending from the midpoint address to the maximum address of the read range. In the operation 405, the address to be accessed by the current read command is identified as being contained within either the first half or the second half of the read range. In an operation 407, a disk drive is selected from a mirrored pair of disk drives for use in performing the current read command. In various embodiments, the mirrored pair of disk drives can be configured as previously described with respect to FIG. 3. Each half of the read range is assigned to a different one of the mirrored pair of disk drives. For example, if the current read command is identified as accessing an address within the first half of the read range, the current read command is directed to be performed using a first disk drive of the mirrored pair of disk drives. Continuing, if the current read command is identified as accessing an address within the second half of the read range, the current read command is directed to be performed using a second disk drive of the mirrored pair of disk drives.

In accordance with the method of FIG. 4, received read commands are distributed to one of the mirrored pair of disk drives depending on the address location to be accessed. Each read command accessing an address location within the first half of the read range will be processed using the first disk drive. Similarly, each read command accessing an address location within the second half of the read range will be processed using the second disk drive. In this manner, the first disk drive is responsible for processing read commands within the first half of the read range, while the second disk drive is responsible for processing read commands within the second half of the read range. Therefore, each of the mirrored pair of disk drives are allowed to focus on a smaller segment of contiguous addresses (i.e., either the first or second half of the read range) when processing read commands. Hence, a read head of each disk drive is not required to move more than half of the current read range when processing read commands. Thus, the method of FIG. 4 results in a decrease of required read head movement, particularly in the case where one or more applications issue read requests that are directed to addresses which are separated by a relatively large physical distance on the disk drives. The decrease of required read head movement by each of the mirrored pair of disk drives results in a decreased latency for processing read commands and an overall increase in system performance. Additionally, the decrease of required read head movement reduces mechanical wear which results in an increase in the mean time between failures (MTBF) for each of the mirrored pair of disk drives.

Figure 5:
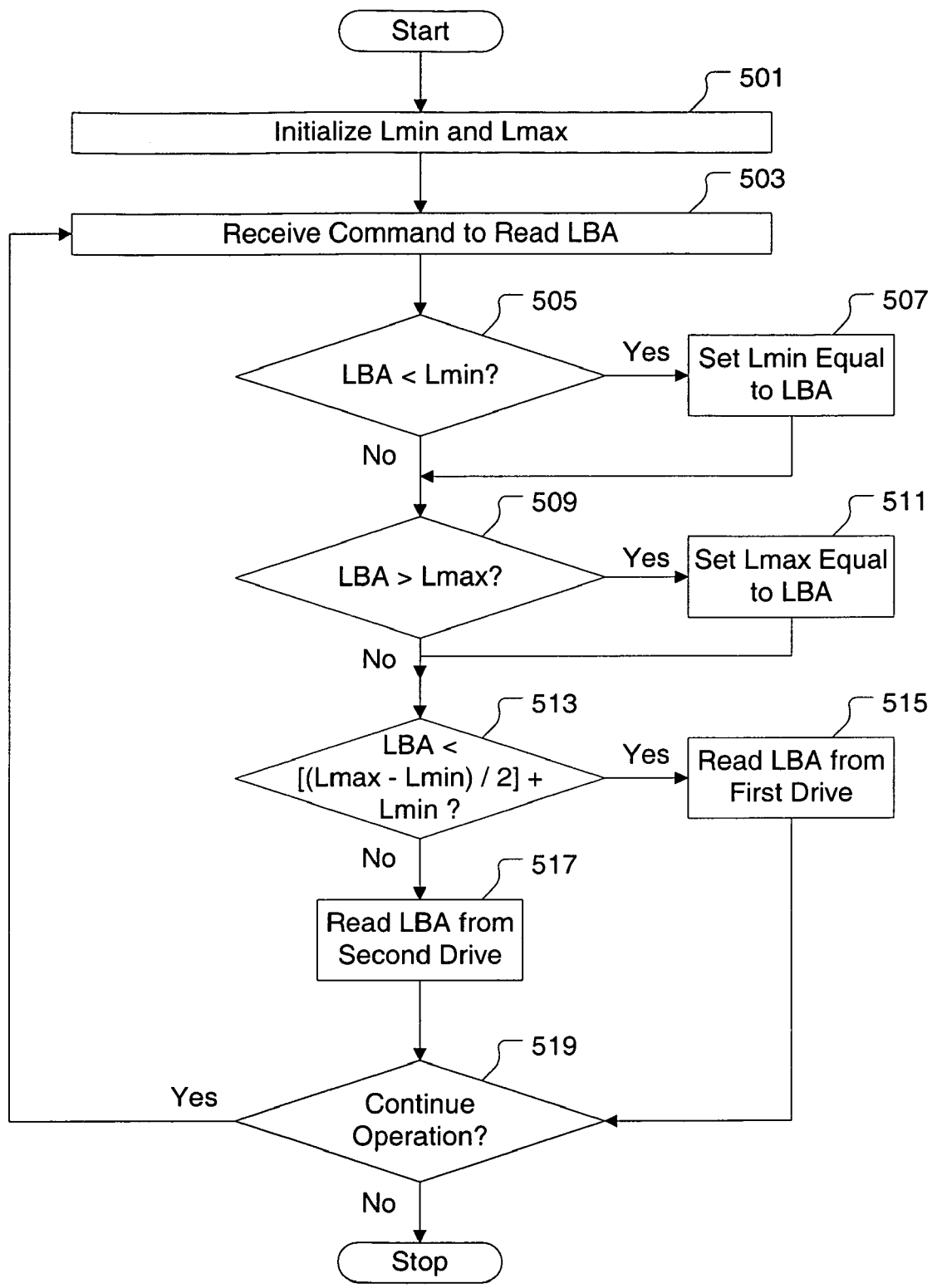
FIG. 5 is an illustration showing a method for controlling utilization of a mirrored pair of digital data storage media, in accordance with one embodiment of the present invention.

FIG. 5 is an illustration showing a method for controlling utilization of a mirrored pair of digital data storage media, in accordance with one embodiment of the present invention. The method of FIG. 5 represents a more detailed description of how the method of FIG. 4 can be implemented in one embodiment of the present invention. The method includes an operation 501 in which parameter Lmin and Lmax are initialized. The parameter Lmin and Lmax represent the minimum address and the maximum address, respectively, of the read range previously discussed. In one embodiment, the Lmin parameter is initialized to be equal to the maximum address available within the mirrored pair of disk drives. Also, in one embodiment, the Lmax parameter is initialized to be equal to the initial address available within the mirrored pair of disk drives (i.e., the address of block 0). The method continues with an operation 503 in which a command is received to read data located at a logical block address (LBA). The LBA corresponds to a block address within the logical drive. In one embodiment, an operation for identifying the command as being a read command is performed prior to operation 503. In an operation 505, the LBA is compared to the Lmin parameter to determine if the address of the LBA is less than the address of the Lmin parameter. If the address of the LBA is less than the address of the Lmin parameter, an operation 507 is performed. In the operation 507, the Lmin parameter is set equal to the LBA. Following completion of operation 507, the method continues with an operation 509. Also, if the address of the LBA is not less than the address of the Lmin parameter in the operation 505, the method continues with the operation 509. In the operation 509, the LBA is compared to the Lmax parameter to determine if the address of the LBA is greater than the address of the Lmax parameter. If the address of the LBA is greater than the address of the Lmax parameter, an operation 511 is performed. In the operation 511, the Lmax parameter is set equal to the LBA. Following completion of operation 511, the method continues with an operation 513. Also, if the address of the LBA is not greater than the address of the Lmax parameter in the operation 509, the method continues with the operation 513. In the operation 513, a determination is made as to whether the LBA resides in a first half of the read range as defined by Lmin and Lmax, wherein the first half of the read range is defined by a bisectional division of the read range. More specifically, operation 513 involves determining a midpoint of the read range by adding half of the difference between Lmax and Lmin to Lmin. The midpoint of the read range is represented mathematically as $[(Lmax-Lmin)/2]+Lmin$. If the address of the LBA is less than the address of the midpoint of the read range, an operation 515 is performed. In the operation 515, the read command is directed to be performed using a first disk drive of the mirrored pair of disk drives. If the address of the LBA is not less than the address of the midpoint of the read range, an operation 517 is performed. In the operation 517, the read command is directed to be performed using a second disk drive of the mirrored pair of disk drives. Following completion of either operation 515 or operation 517, the method continues with an operation 519. Absent a termination signal at operation 519, the method continues from operation 519 by reverting back to operation 503 and repeating as described above. In accordance with the foregoing, the method of FIG. 5 is capable of providing a balanced distribution of read commands to the mirrored pair of disk drives.

Figure 6:
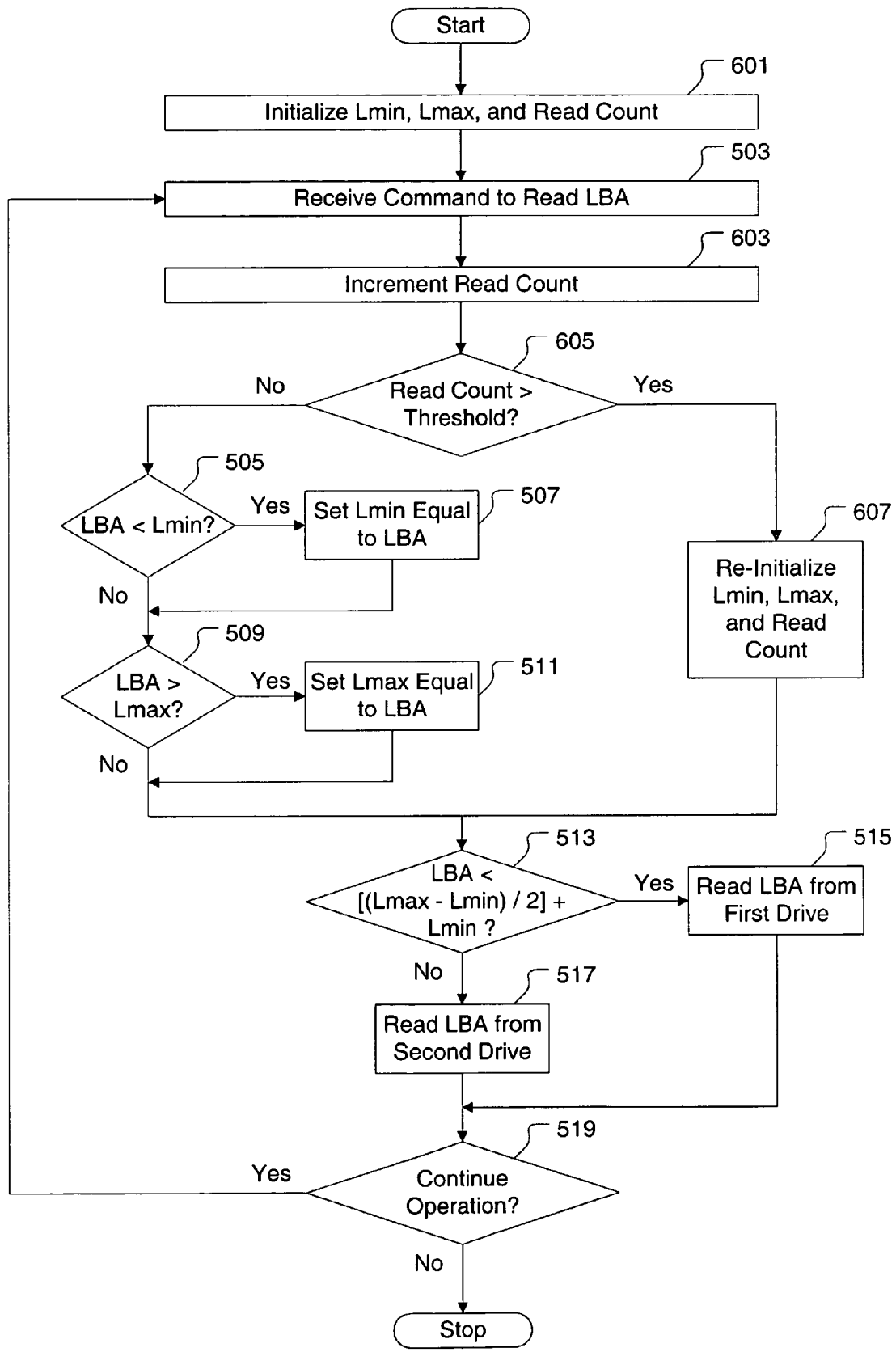
FIG. 6 is an illustration showing a read range re-initialization method implemented as part of the method for controlling utilization of the mirrored pair of digital data storage media as described with respect to FIG. 5, in accordance with one embodiment of the present invention.

FIG. 6 is an illustration showing a read range re-initialization method implemented as part of the method for controlling utilization of the mirrored pair of digital data storage media as described with respect to FIG. 5, in accordance with one embodiment of the present invention. The method of FIG. 6 includes an operation 601 for initializing a read count parameter in addition to the Lmin and Lmax parameters. With respect to the Lmin and Lmax parameters, operation 601 is similar to operation 501 of FIG. 5. The read count parameter, however, is introduced in the method of FIG. 6 as part of the read range re-initialization method. The read count parameter represents a count of the number of read commands that have been processed since a previous initialization/re-initialization. In the operation 601, the read count parameter is initialized to zero. The method proceeds with the operation 503 in which a command is received to read data located at the LBA, as previously described with respect to FIG. 5. In an operation 603, the read count parameter is incremented by one. The method continues with an operation 605 in which a determination is made as to whether the read count parameter is greater than a threshold value. The threshold value represents a number of read commands to be processed prior to re-initialization of the read range. In one embodiment, the threshold value is preset by a system administrator. In another embodiment, the threshold value can be dynamically set based on operational characteristics of the system. If the read count parameter is greater than the threshold value, the method proceeds with an operation 607 in which the Lmin, Lmax, and read count parameters are re-initialized as previously done in the operation 601. Upon completion of the re-initialization in operation 607, the method proceeds to the operation 513. If the read count is not greater than the threshold value in the operation 605, the method proceeds with updating the read range by performing operations 505, 507, 509, and 511 as previously discussed with respect to the method of FIG. 5. Once either the read range update or the re-initialization is completed, the method proceeds to the operation 513. The operations 513, 515, 517, and 519 are then performed as previously discussed with respect to the method of FIG. 5.

Re-initialization of the Lmin, Lmax, and read count parameters allows the read range to be reset after a number of read commands have been processed. Resetting the read range can be helpful in preventing one of the mirrored pair of disk drives from being used to process a majority of the number of read commands. For example, if one or more applications are submitting read requests to access data at LBAs that are substantially disparate from one another with respect to address location, the read range can become broad. Then, if the read requests to a particular half of the read range decrease in number (e.g., the application submitting read request to that half of the read range is terminated), the physical disk responsible for the opposite half of the read range may be tasked to perform a majority of the read command processing. Thus, by providing a method for allowing the read range to be reset, the read range can be dynamically controlled to closely bound the LBAs that are currently being accessed for processing read commands. In accordance with the foregoing, the method of FIG. 6 is capable of ensuring provision of a continuously balanced distribution of read commands to the mirrored pair of disk drives.

Figure 7:
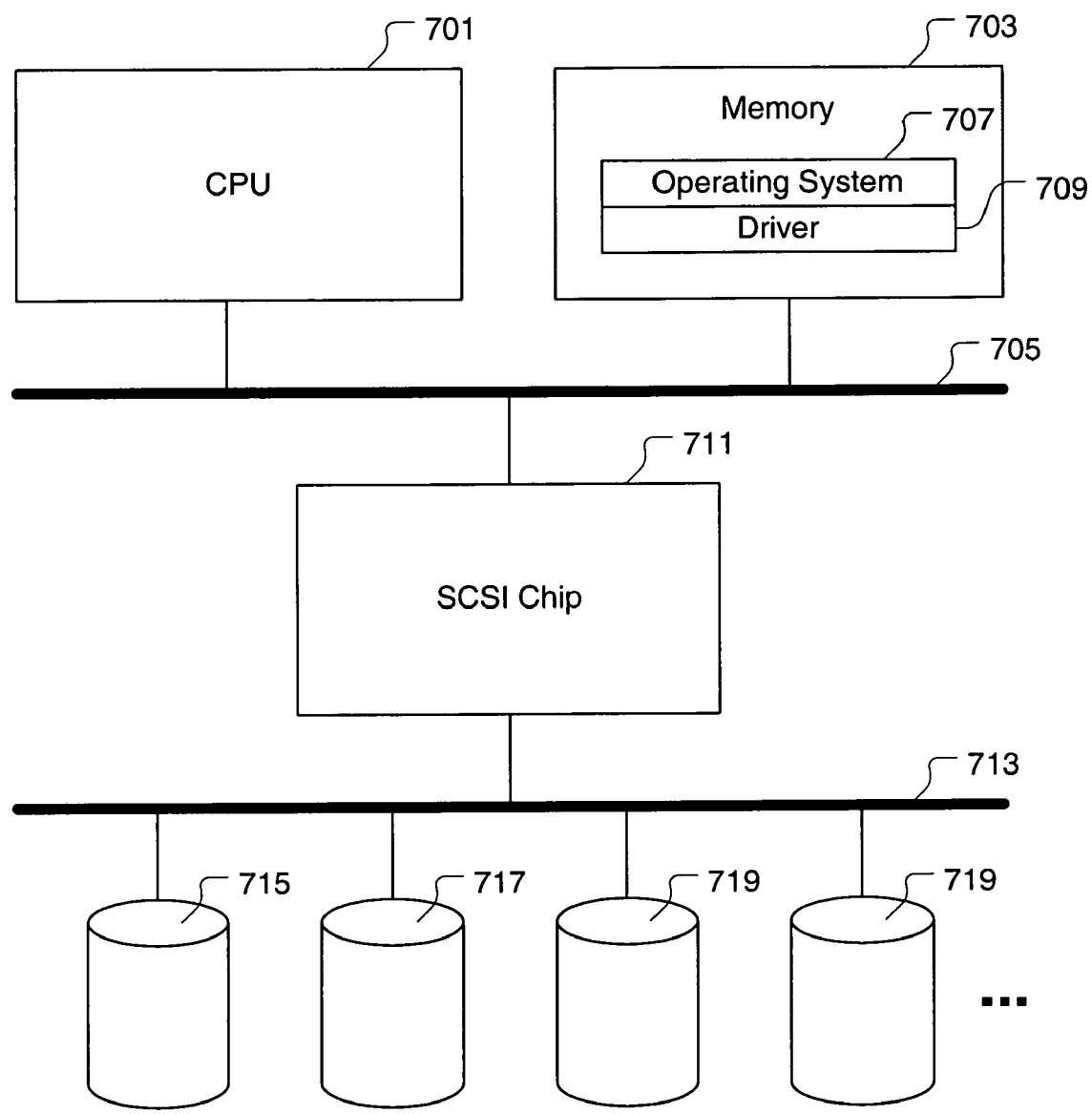
FIG. 7 is an illustration showing an apparatus implementing a host-based solution for distributing read commands to multiple disk drives, in accordance with one embodiment of the present invention.

FIG. 7 is an illustration showing an apparatus implementing a host-based solution for distributing read commands to multiple disk drives, in accordance with one embodiment of the present invention. The apparatus includes a central processing unit (CPU) 701 and a memory 703. Both the CPU 701 and the memory 703 are in communication with a front-end bus 705. A SCSI chip 711 is disposed to be in communication with the front-end bus 705 and a back-end bus 713. A number disk drives 715, 717, and 719, are in also communication with the back-end bus 713. At least two of the disk drives (715 and 717) represent a mirrored pair of disk drives implementing a RAID level 1 storage system, respectively.

An operating system 707 and a driver 709 reside in the memory 703. The operating system is capable of issuing read commands to the driver 709. The driver 709 represents a set of program instructions defined to implement the methods previously described with respect to FIGS. 4, 5, and 6 for distributing the read commands to the mirrored pair of disk drives 715 and 717. Once the appropriate disk drive to be used for processing of the read command is determined by the driver 709, instructions are communicated from the driver 709 to the SCSI chip 711 via the bus 705. The SCSI chip 711 allows the driver 709 to communicate with the disk drives and allows data to be transferred between the disk drives and the memory 703. Communicating through the bus 713, the SCSI chip 711 tasks the appropriate disk drive (715 or 717) to perform the read command.

Figure 8:
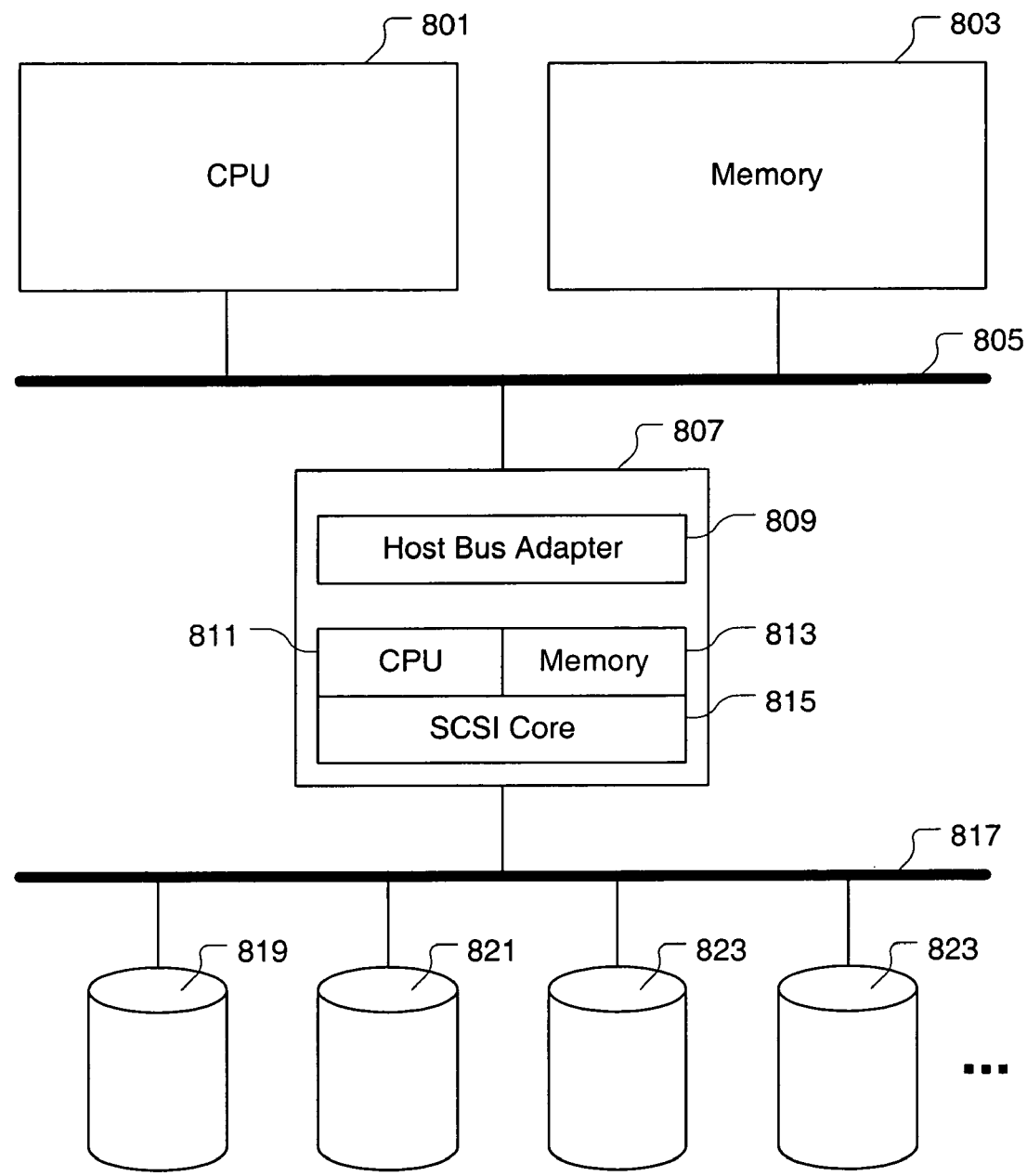
FIG. 8 is an illustration showing an apparatus implementing a input/output processor (IOP) based solution for distributing read commands to multiple disk drives, in accordance with one embodiment of the present invention.

FIG. 8 is an illustration showing an apparatus implementing a input/output processor (IOP) based solution for distributing read commands to multiple disk drives, in accordance with one embodiment of the present invention. The apparatus includes a CPU 801 and a memory 803. Both the CPU 801 and the memory 803 are in communication with a front-end bus 805. A RAID chip 807 is disposed to be in communication with the front-end bus 805 and a back-end bus 817. A number disk drives 819, 821, and 823, are in also communication with the back-end bus 817. At least two of the disk drives (819 and 821) represent a mirrored pair of disk drives implementing a RAID level 1 storage system, respectively.

The RAID chip 807 includes a host bus adapter 809, a CPU 811, a memory 813, and a SCSI core 815. The host bus adapter 809 allows the RAID chip to interface in a two-way manner with the CPU 801 and memory 803 via the bus 805. An operating system resides in the memory 803 and is capable of issuing read commands to the RAID chip 807. The memory 813 contains program instructions for implementing the methods previously described with respect to FIGS. 4, 5, and 6 upon receipt of the read command from the operating system. The CPU 811 is used to execute the program instructions from the memory 813 for appropriately distributing the read command to either of the pair of mirrored disk drives 819 and 821. The SCSI core 815 communicates the read command instructions to the appropriate disk drive and allows data to be transferred between the disk drive and the memory 803.

Figure 9:
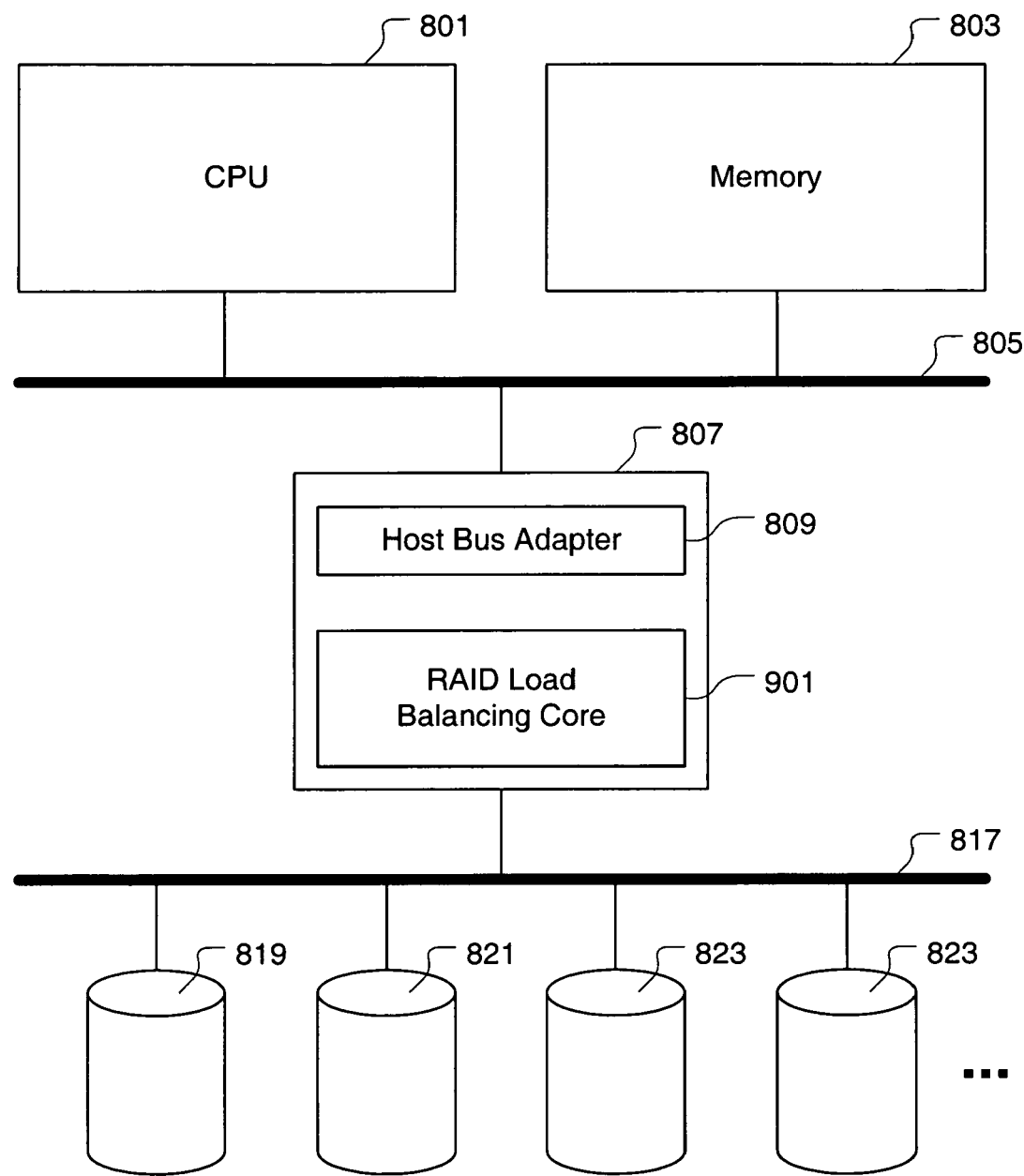
FIG. 9 is an illustration showing an apparatus implementing a hardware-based solution for distributing read commands to multiple disk drives, in accordance with one embodiment of the present invention.

FIG. 9 is an illustration showing an apparatus implementing a hardware-based solution for distributing read commands to multiple disk drives, in accordance with one embodiment of the present invention. The apparatus of FIG. 9 is similar to the apparatus of FIG. 8 with the exception that the CPU 811, the memory 813, and the SCSI core 815 of the RAID chip 807 have been combined to form a RAID load balancing core 901. The program instructions previously contained within the memory 813 are defined as circuitry in the RAID load balancing core 901 through use of logic gates. Thus, the RAID load balancing core 901 is configured to have circuitry capable of performing the methods previously described with respect to FIGS. 4, 5, and 6 for distributing the read commands to the mirrored pair of disk drives 819 and 821. It should be appreciated that the RAID load balancing core 901 can be synthesized using a suitable hardware description language (HDL), e.g., Verilog HDL, that incorporates the functionality described above with reference to FIGS. 4, 5, and 6.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for distributing read commands to multiple disk drives, comprising:
   receiving a read command from an operating system, the read command being directed to a starting logical block address;
   updating an extent of a logical block address range so as to include the starting logical block address;
   dividing the logical block address range into a number of portions of substantially equal size, wherein the number of portions of the logical block address range correspond to a number of mirrored physical disk drives available to service the received read command;

assigning each of the number of mirrored physical disk drives to service a respective one of the number of portions of the logical block address range such that each mirrored physical disk drive is assigned to service a separate portion of the logical block address range;

determining a particular portion of the logical block address range containing the starting logical block address; and executing the read command using the mirrored physical disk drive assigned to the particular portion of the logical block address range.

2. A method for distributing read commands to multiple disk drives as recited in claim 1, wherein the particular portion of the logical block address range containing the starting logical block address represents one of a first half of the logical block address range and a second half of the logical block address range.

3. A method for distributing read commands to multiple disk drives as recited in claim 1, wherein the mirrored physical disk drive associated with the particular portion of the logical block address range containing the starting logical block address is one of a mirrored pair of disk drives.

4. A method for distributing read commands to multiple disk drives as recited in claim 3, wherein a first physical disk drive of the mirrored pair of disk drives is associated with a first half of the logical block address range and a second physical disk drive of the mirrored pair of disk drives is associated with a second half of the logical block address range.

5. A method for distributing read commands to multiple disk drives as recited in claim 1, further comprising:
    initializing the logical block address range prior to receiving the read command from the operating system;
    tracking a number of received read commands;
    determining when a preset threshold number is exceeded by the number of received read commands; and
    re-initializing the logical block address range upon determining that the preset threshold number is exceeded by the number of received read commands.

6. A method for distributing read commands to multiple disk drives as recited in claim 1, wherein the read commands are distributed to multiple mirrored physical disk drives implementing a redundant array of independent disks level 1 (RAID1) storage system.

7. A method for controlling utilization of a mirrored pair of digital data storage media, comprising:
    establishing a range of logical block addresses, the range of logical block addresses being bound by a minimum logical block address and a maximum logical block address;
    receiving a read command, the read command being associated with a logical block address;
    comparing the logical block address to the minimum and the maximum logical block addresses to determine an adjustment to be made to one of the minimum logical block address, the maximum logical block address, and both the minimum and maximum logical block addresses;
    adjusting the minimum and maximum logical block addresses based on the comparing;
    dividing the range of logical block addresses into two separate portions of substantially equal size;
    assigning each of the mirrored pair of digital data storage media to respectively service a separate one of the two portions of the range of logical block addresses;
    identifying a portion of the range of logical block addresses containing the logical block address associated with the received read command; and
    executing the received read command using the digital data storage medium assigned to associated with the identified portion of the range of logical block addresses containing the logical block address associated with the received read command.

8. A method for controlling utilization of a mirrored pair of digital data storage media as recited in claim 7, wherein the mirrored pair of digital data storage media is implemented as a redundant array of independent disks level 1 (RAID1) storage system.

9. A method for controlling utilization of a mirrored pair of digital data storage media as recited in claim 7, wherein the range of logical block addresses represents a portion of a logical storage drive, the logical storage drive being mapped to each of the mirrored pair of digital data storage media.

10. A method for controlling utilization of a mirrored pair of digital data storage media as recited in claim 7, wherein the comparing includes determining the logical block address to be less than the minimum logical block address and the adjusting includes setting the minimum logical block address equal to the logical block address.

11. A method for controlling utilization of a mirrored pair of digital data storage media as recited in claim 7, wherein the comparing includes determining the logical block address to be greater than the maximum logical block address and the adjusting includes setting the maximum logical block address equal to the logical block address.

12. A method for controlling utilization of a mirrored pair of digital data storage media as recited in claim 7, further comprising:
    initializing the minimum logical block address to a maximum address available within the mirrored pair of digital data storage media; and
    initializing the maximum logical block address to an initial address available within the mirrored pair of digital data storage media,
    wherein the initializing of the minimum and maximum logical block addresses is performed prior to receiving the read command.

13. A method for controlling utilization of a mirrored pair of digital data storage media as recited in claim 12, further comprising:
    initializing a read command count to zero;
    incrementing the read command count by one upon receiving the read command;
    comparing the read command count to a preset threshold number;
    determining when the preset threshold number is exceeded by the read command count; and
    re-initializing the minimum logical block address, the maximum logical block address, and the read command count upon determining that the preset threshold number is exceeded by the read command count.

14. A computer readable storage medium containing program instructions for distributing read commands to multiple disk drives, comprising:
    program instructions for receiving a read command from an operating system, the read command being directed to a starting logical block address;
    program instructions for updating an extent of a logical block address range so as to include the starting logical block address;

program instructions for dividing the logical block address range into a number of portions of substantially equal size, wherein the number of portions of the logical block address range correspond to a number of mirrored physical disk drives available to service the received read command;

program instructions for assigning each of the number of mirrored physical disk drives to service a respective one of the number of portions of the logical block address range such that each mirrored physical disk drive is assigned to service a separate portion of the logical block address range;

program instructions for determining a particular portion of the logical block address range containing the starting logical block address; and program instructions for directing the read command to be performed using the mirrored physical disk drive assigned to the particular portion of the logical block address range.

15. A computer readable storage medium containing program instructions for distributing read commands to multiple disk drives as recited in claim 14, wherein the particular portion of the logical block address range containing the starting logical block address represents one of a first half of the logical block address range and a second half of the logical block address range.

16. A computer readable storage medium containing program instructions for distributing read commands to multiple disk drives as recited in claim 14, wherein the mirrored physical disk drive associated with the particular portion of the logical block address range containing the starting logical block address is one of a mirrored pair of disk drives.

17. A computer readable storage medium containing program instructions for distributing read commands to multiple disk drives as recited in claim 16, wherein a first physical disk drive of the mirrored pair of disk drives is associated with a first half of the logical block address range and a second physical disk drive of the mirrored pair of disk drives is associated with a second half of the logical block address range.

18. A computer readable storage medium containing program instructions for distributing read commands to multiple disk drives as recited in claim 14, further comprising:

program instructions for initializing the logical block address range prior to receiving the read command from the operating system;

program instructions for tracking a number of received read commands;

program instructions for determining when a preset threshold number is exceeded by the number of received read commands; and program instructions for re-initializing the address range upon determining that the preset threshold number is exceeded by the number of received read commands.

19. A computer readable storage medium containing program instructions for distributing read commands to multiple disk drives as recited in claim 14, wherein the read commands are distributed to multiple mirrored physical disk drives implementing a redundant array of independent disks level 1 (RAID1) storage system.

20. An apparatus for distributing read commands to multiple disk drives, comprising:

a central processing unit;

a memory configured to be controlled by the central processing unit, the memory containing an operating system for generating read commands;

a logical drive being defined within the memory, the logical drive defined to be mapped to a portion of each of a mirrored pair of disk drives, the mirrored pair of disk drives including a first disk drive and a second disk drive; and a driver disposed to be in communication with the mirrored pair of disk drives, the driver being configured to monitor a read range within the logical drive, the read range being defined by a minimum address having been read from the logical drive and a maximum address having been read from the logical drive, the driver being further configured to identify a read command as being directed to either a first half of the read range or a second half of the read range, the driver being configured to direct the read command to the first disk drive when the read command is identified as being directed to the first half of the read range, and the driver being configured to direct the read command to the second disk drive when the read command is identified as being directed to the second half of the read range.

21. An apparatus for distributing read commands to multiple disk drives as recited in claim 20, wherein the mirrored pair of disk drives represent a redundant array of independent disks level 1 (RAID1) storage system.

22. An apparatus for distributing read commands to multiple disk drives as recited in claim 20, wherein the driver is further configured to initialize the read range, update the read range based on received read commands, and reinitialize the read range based on predetermined criteria.

23. An apparatus for distributing read commands to multiple disk drives as recited in claim 20, wherein the driver is contained within the memory.

24. An apparatus for distributing read commands to multiple disk drives as recited in claim 23, wherein the central processing unit and the memory are contained within a common chip.

25. An apparatus for distributing read commands to multiple disk drives as recited in claim 23, wherein the central processing unit and the memory are respectively contained within separate chips.

26. An apparatus for distributing read commands to multiple disk drives as recited in claim 20, wherein the driver is implemented as circuitry within a chip.

* * * * *